(12) United States Patent
Zhang et al.

(10) Patent No.: US 7,495,908 B2
(45) Date of Patent: Feb. 24, 2009

(54) MOUNTING APPARATUS FOR DATA STORAGE DEVICE

(75) Inventors: Xue-Cheng Zhang, Shenzhen (CN); Hao Lan, Shenzhen (CN); Pin-Shian Wu, Taipei Hsien (TW); Qin Guo, Shenzhen (CN); Chun-Chi Liang, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 80 days.

(21) Appl. No.: 11/770,751

(22) Filed: Jun. 29, 2007

(65) Prior Publication Data
US 2008/0000849 A1   Jan. 3, 2008

(30) Foreign Application Priority Data
Jun. 30, 2006   (CN) .................... 2006 2 0014373 U

(51) Int. Cl.
*H05K 5/00* (2006.01)
*H05K 7/00* (2006.01)
*G06F 1/16* (2006.01)
(52) U.S. Cl. .................... 361/685; 361/684; 361/686
(58) Field of Classification Search .................. 361/684, 361/685, 686
See application file for complete search history.

(56) References Cited

U.S. PATENT DOCUMENTS

| 7,088,580 B2 | 8/2006 | Chen et al. | |
|---|---|---|---|
| 7,198,338 B2 | 4/2007 | Liu et al. | |
| 7,405,950 B2 * | 7/2008 | Zhang et al. | 361/810 |
| 2005/0078445 A1 * | 4/2005 | Chen et al. | 361/685 |
| 2005/0116135 A1 * | 6/2005 | Peng et al. | 248/694 |
| 2006/0232925 A1 * | 10/2006 | Han et al. | 361/685 |
| 2007/0019377 A1 * | 1/2007 | Chen et al. | 361/685 |
| 2007/0235625 A1 * | 10/2007 | Liang et al. | 248/675 |
| 2007/0236878 A1 * | 10/2007 | Lin et al. | 361/684 |
| 2007/0279889 A1 * | 12/2007 | Zhang et al. | 361/810 |

\* cited by examiner

*Primary Examiner*—Jayprakash N Gandhi
*Assistant Examiner*—Anthony M Haughton
(74) *Attorney, Agent, or Firm*—Frank R. Niranjan

(57) ABSTRACT

A mounting apparatus is provided for mounting a data storage device to a drive bracket. The data storage device is locked to the drive bracket via a locking module. The locking module includes a housing member attached to the drive bracket, and a pushing member, a locking member, and a releasing member that are attached to the housing member. The pushing member is driven by a pushing action of the data storage device for releasing the locking member in a first direction for locking the data storage device. The locking member is driven by the releasing member for unlocking the data storage device in an opposite direction with respect to the first direction.

17 Claims, 7 Drawing Sheets

MOUNTING APPARATUS FOR DATA STORAGE DEVICE

BACKGROUND OF THE INVENTION

1. Field of the Invention

The present invention generally relates to mounting apparatuses for data storage devices. More particularly, the present invention relates to a mounting apparatus for readily mounting a data storage device to a bracket.

2. Description of Related Art

Data storage devices includes hard disc drives (HDDs), digital versatile disc read only memory (DVD ROM) drives, high definition digital versatile disc read only memory (HD-DVD ROM) drives, and blu-ray disc read only memory (BD ROM) drives. These data storage devices are currently used in many situations, such as personal computers, game consoles, personal video recorders (PVRs) and so on. Such data storage devices should be mounted firmly to the computers, the game consoles, and the PVRs to ensure reliable performance.

A typical mounting apparatus includes a drive bracket mounted in an enclosure. A plurality of through holes is defined in the drive bracket. A plurality of fixing holes corresponding to the through holes is defined in side plates of the data storage device. Generally, the data storage device is first put in the drive bracket, and then mounted therein with screws. However, using the screws for mounting the data storage device, and removing the screws for dismounting, is time-consuming. Additionally, the above describe operations inconveniently require the use of tools.

Thus, a mounting apparatus is desired to overcome the problems discussed above.

SUMMARY OF THE INVENTION

Accordingly, a mounting apparatus is provided for mounting a data storage device. The mounting apparatus includes a drive bracket, a housing member, a pushing member, a locking member, and a releasing member. The drive bracket defines an accommodating space for accommodating the data storage device. The housing member is configured for being fastened to the drive bracket, and is formed with at least a first resilient member. The locking member is configured for locking the data storage device with the drive bracket. The pushing member is coupled to the housing member, and is configured for holding the locking member to the housing member. The pushing member is partially received in the accommodating space and holds the locking member outside of the accommodating space, when the data storage device is detached from the drive bracket. When the data storage device is received in the accommodating space, the pushing member is urged to move out of the accommodating space and release the locking member such that the first resilient member restores to drive the locking member to lock the data storage device with the drive bracket. The releasing member is attached to the housing member. The releasing member is depressed for urging the locking member to unlock the data storage device from the drive bracket.

Other systems, methods, features, and advantages of the present mounting apparatus will be or become apparent to one with skill in the art upon examination of the following drawings and detailed description. It is intended that all such additional systems, methods, features, and advantages be included within this description, be within the scope of the present apparatus, and be protected by the accompanying claims.

BRIEF DESCRIPTION OF THE DRAWINGS

Many aspects of the present mounting apparatus can be better understood with reference to the following drawings. The components in the drawings are not necessarily drawn to scale, emphasis instead being placed upon clearly illustrating the principles of the present device. Moreover, in the drawings, like reference numerals designate corresponding parts throughout the several views.

DETAILED DESCRIPTION OF THE INVENTION

Reference will now be made in detail to the preferred embodiments of the present mounting apparatus, examples of which are illustrated in the accompanying drawings.

Figure 1:
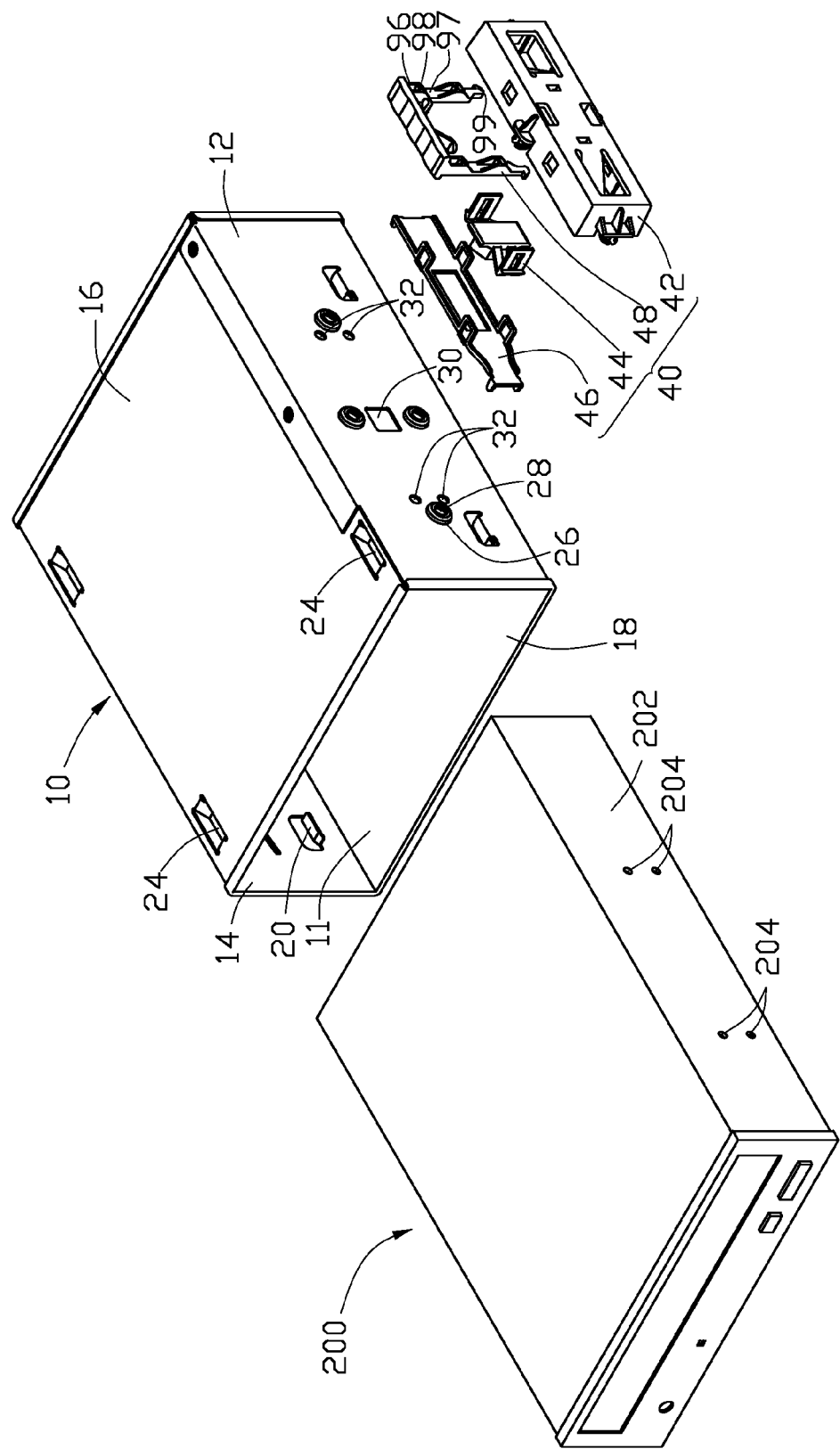
FIG. 1 is an exploded, isometric view of a mounting apparatus in accordance with an exemplary embodiment, the mounting apparatus including a locking module, a drive bracket, and a data storage device.

Referring to FIG. 1, a mounting apparatus is configured for mounting a data storage device such as a disc drive 200. The mounting apparatus includes a drive bracket 10 and a locking module 40. The drive bracket 10 is configured for accommodating the drive 200 therein. The locking module 40 is configured for mounting the drive 200 to the drive bracket 10. The drive 200 includes a first side plate 202 and a second side plate 206 (see FIG. 5). Two pairs of fixing holes 204 are defined in the first side plate 202.

The drive bracket 10 includes a first side wall 12, a second side wall 14, a top wall 16, and a bottom wall 18. The first side wall 12 and the second side wall 14 are parallel with each other, and are perpendicular to the top wall 16 and the bottom wall 18. The walls 12, 14, 16, 18 are sequentially connected, defining an accommodating space 11 for accommodating the drive 200 therein. A plurality of support members 20 is bent from the side walls 12, 14, and extends into the accommodating space 11 for supporting the drive 200 thereon.

A plurality of trapezium-shaped protruding members 24 protrudes inward into the accommodating space 11 from the top wall 16, corresponding to the support members 20. When the drive 200 is received in the drive bracket 10, the protruding members 24 resiliently press the drive 200 for securely retaining the drive 200 in the drive bracket 10.

An opening 30 is defined in an approximately central area of the first side wall 12. A plurality of protrusions 26 around the opening 30 protrudes outwardly from the first side wall 12. The protrusions 26 are distributed substantially between the support members 20 of the first side wall 12 and the top wall 16. A virtual diamond shape is defined by sequentially connecting the protrusions 26 with straight lines. A positioning hole 28 is defined in each of the protrusions 26. Two pairs of locating holes 32 corresponding to the fixing holes 204 are defined in the first side wall 12.

A plurality of resilient strips 34 (see FIG. 5) protrudes inward into the accommodating space 11 from the second side wall 14. The strips 14 are located between the support members 20 of the second side wall 14 and the top wall 16. An elastic force is exerted against the drive 200 by the strips 34, when the drive 200 is installed in the drive bracket 10.

Figure 2:
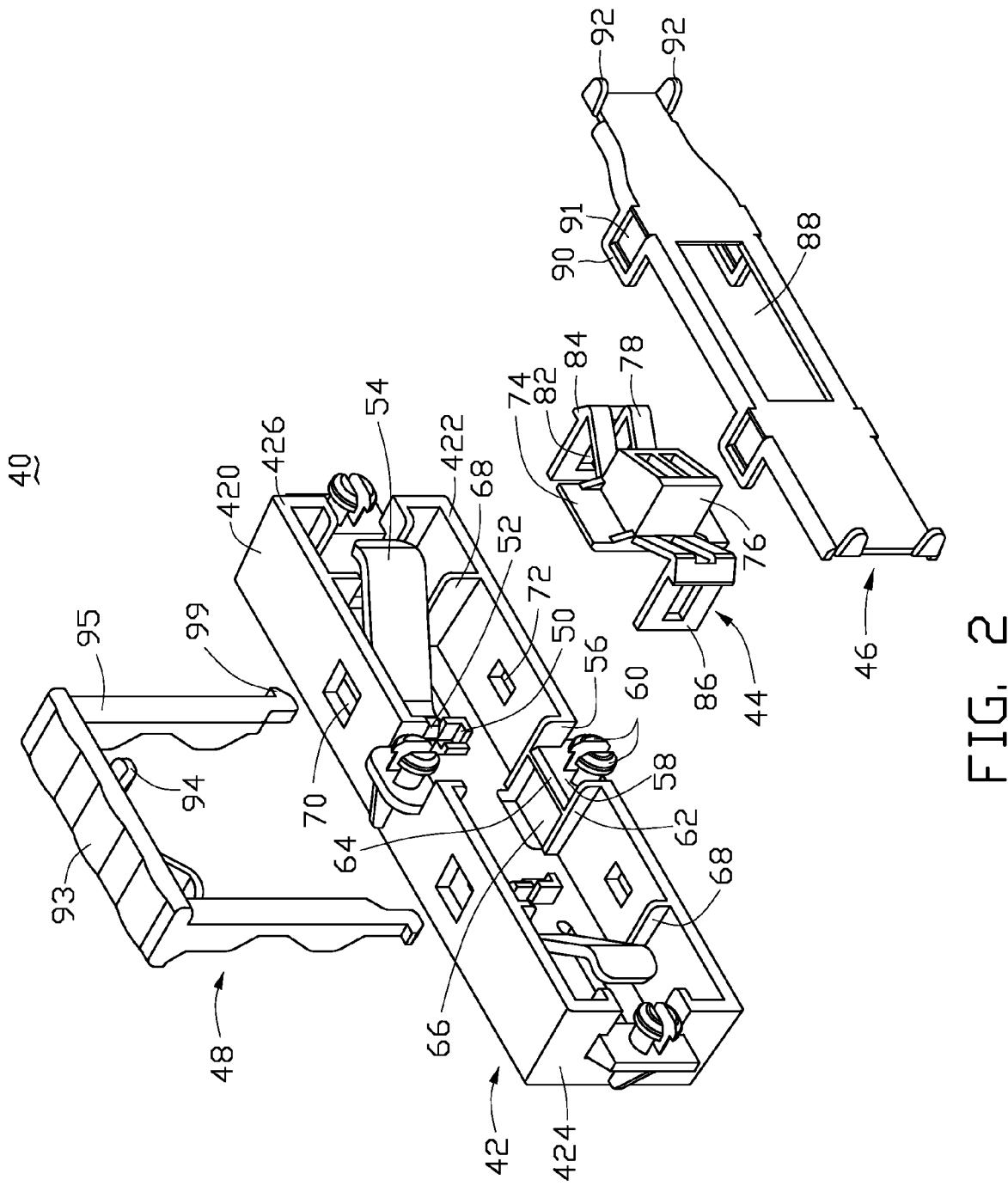
FIG. 2 is an exploded, enlarged, isometric view of the locking module in FIG. 1, but shown from another aspect.

Referring to FIG. 2, the locking module 40 includes a housing mechanism or housing member 42, a locking mechanism or locking member 46, a pushing member 44, and a releasing member 48.

The housing member 42 is configured for being fastened to the first side wall 12 of the drive bracket 10, and houses the pushing member 44, the locking member 46, and the releasing member 48. The housing member 42 is substantially a semi-closed parallelepiped body. The housing member 42 includes two parallel long side walls 420, 422, two parallel short side walls 424, 426, and a connecting wall 428 (see FIG. 6). The walls 420, 422 424, 426 are interconnected to construct a rectangular frame. The connecting wall 428 is located at a side of the frame, connecting to edges of the walls 420, 422, 424, 426 on the same side.

A notch 56 is defined in a substantially middle portion of each of the walls 420, 422, 424, 426. A platform 58 is formed adjacent to the end of each notch 56. An approximately round fixing member 60 with a bulging distal end extends outward from each platform 58 into the corresponding notch 56. Each fixing member 60 is split into two elastic parts with a narrow slit (not labeled) defined therebetween.

A retaining portion 64 is formed at an inner edge of each of the platforms 58 of the walls 420, 422. The retaining portion 64 is capable of being resiliently deformed. A pair of first ribs 62 adjacent to the notches 56, and a pair of second ribs 68, protrude inward from the inner side of each of the walls 420, 422. The first ribs 62 and the retaining portion 64 together define receiving slots 66 therein. A pair of through holes 70, and a pair of coupling holes 72, are defined in the walls 420, 422 respectively. The through holes 70 and the coupling holes 72 are equally distributed with respect to the two platforms 58.

A pair of first resilient arms 54 and a pair of receiving portions 50 protrude inward from the connecting wall 428, and are distributed in a substantially symmetrical fashion. The receiving portions 50 are defined with inserting holes (not labeled) therein. A hook 52 is formed on each receiving portion 50. Each hook 52 can be resiliently deformed. Each of the first resilient arms 54 extends slantwise toward the walls 424, 426 respectively. Each resilient arm 54 is bent with substantially a flat portion (not labeled) parallel to the connecting wall 428 at its free end.

The pushing member 44 has an M-shaped configuration. The pushing member 44 includes a base plate 74, a first translating section such as a wedge 76, a pair of wings 78, and a pair of latching portions 86. The base plate 74 is substantially rectangular shaped. The wedge 76 protrudes from one side of the base plate 74. The wedge 76 has an inclined surface at an end portion (not labeled) away from the base plate 74. Each of the wings 78 extends from one end of the base plate 74 with an acute angle relative to the wedge 76. Each of the latching portions 86 extends from a distal end of each wing 78 in a direction generally perpendicular to the base plate 74. An engaging section 84 protrudes from a joint portion of each latching portions 86 and each wing 78. A cut slot 82 is defined in each of the latching portions 86.

The locking member 46 is configured for locking and unlocking the drive 200 to and from the drive bracket 10. The locking member 46 is engagably coupled to the pushing member 44. The locking member 46 is generally a rectangular shaped plate with a tapered end (not labeled). A plurality of latching tabs 92 is perpendicularly bent from the tapered end and an end opposite to the tapered end. A plurality of coupling brackets 90 perpendicularly extends from the locking member 46 in an opposite direction that the latching tabs 92 extend. A communicating hole 91 is defined in each coupling bracket 90 corresponding to each through hole 70 and each coupling hole 72. A locking hole 88 is defined in an approximately central portion of the locking member 46.

Figure 3:
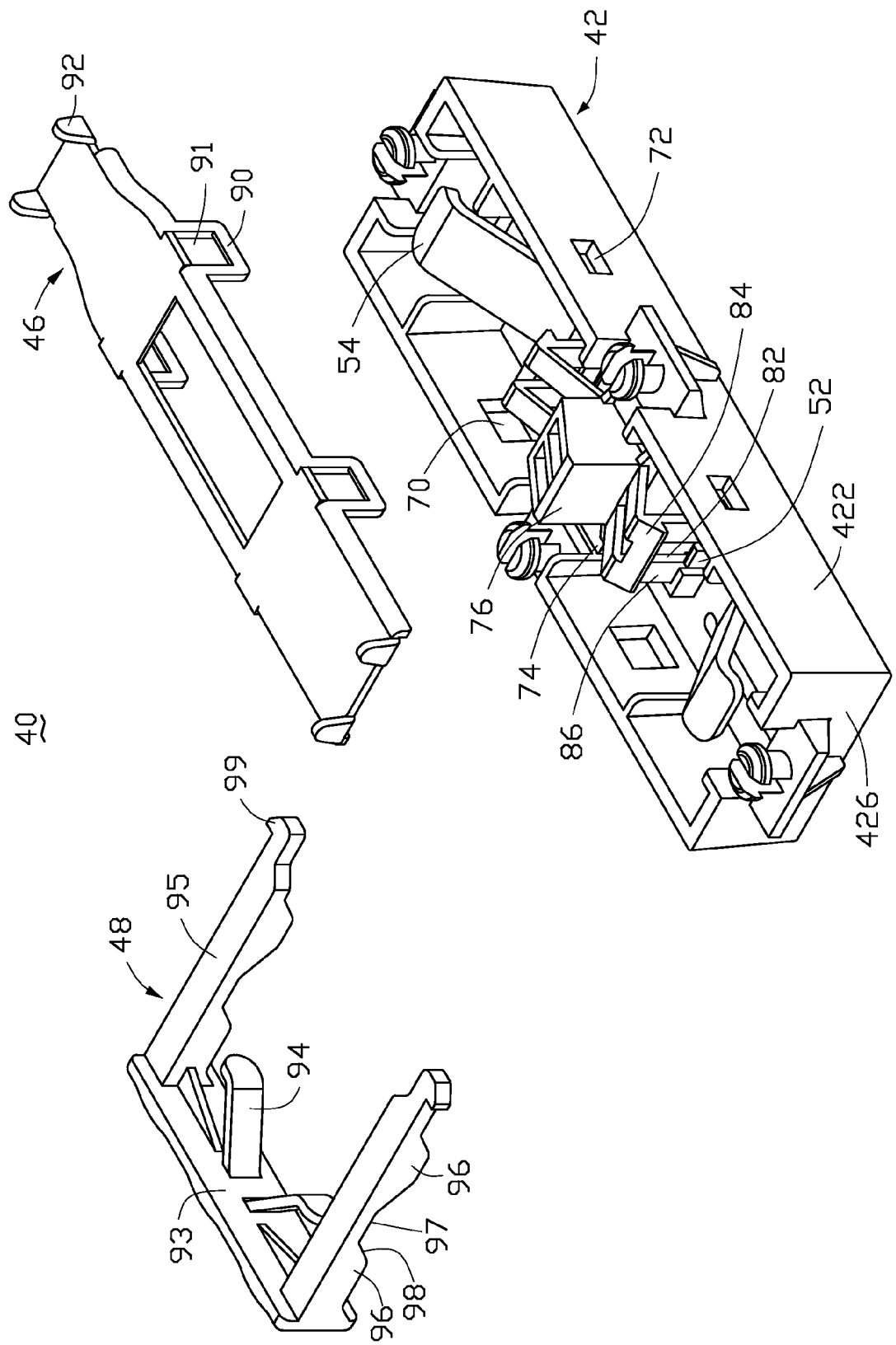
FIG. 3 is an enlarged, partially assembled view of the locking module in FIG. 1, but shown from another aspect.

Referring to FIG. 3, the releasing member 48 includes an operating portion 93 and two extension legs 95. The two extension legs 95 are parallel with each other. An inverted U-shaped configuration is presented with the two extension legs 95 extending from opposite ends of the operating portion 93. A pair of second resilient arms 94 projects downwards from the operating portion 93. Each resilient arm 94 is bent with a substantially flat portion (not labeled) at its free end. Two spaced protruding portions 96 protrude laterally from each of the extension legs 95. A dented portion 97 is defined below each of the two protruding portions 96 adjacent to the operating portion 93. A slanted portion 98 connects each of the protruding portions 96 to the corresponding adjacent dented portion 97. A clasp 99 is formed at a distal end of each extension leg 95. The extension legs 95 are capable of being resiliently deformed for approaching close to each other.

Figure 4:
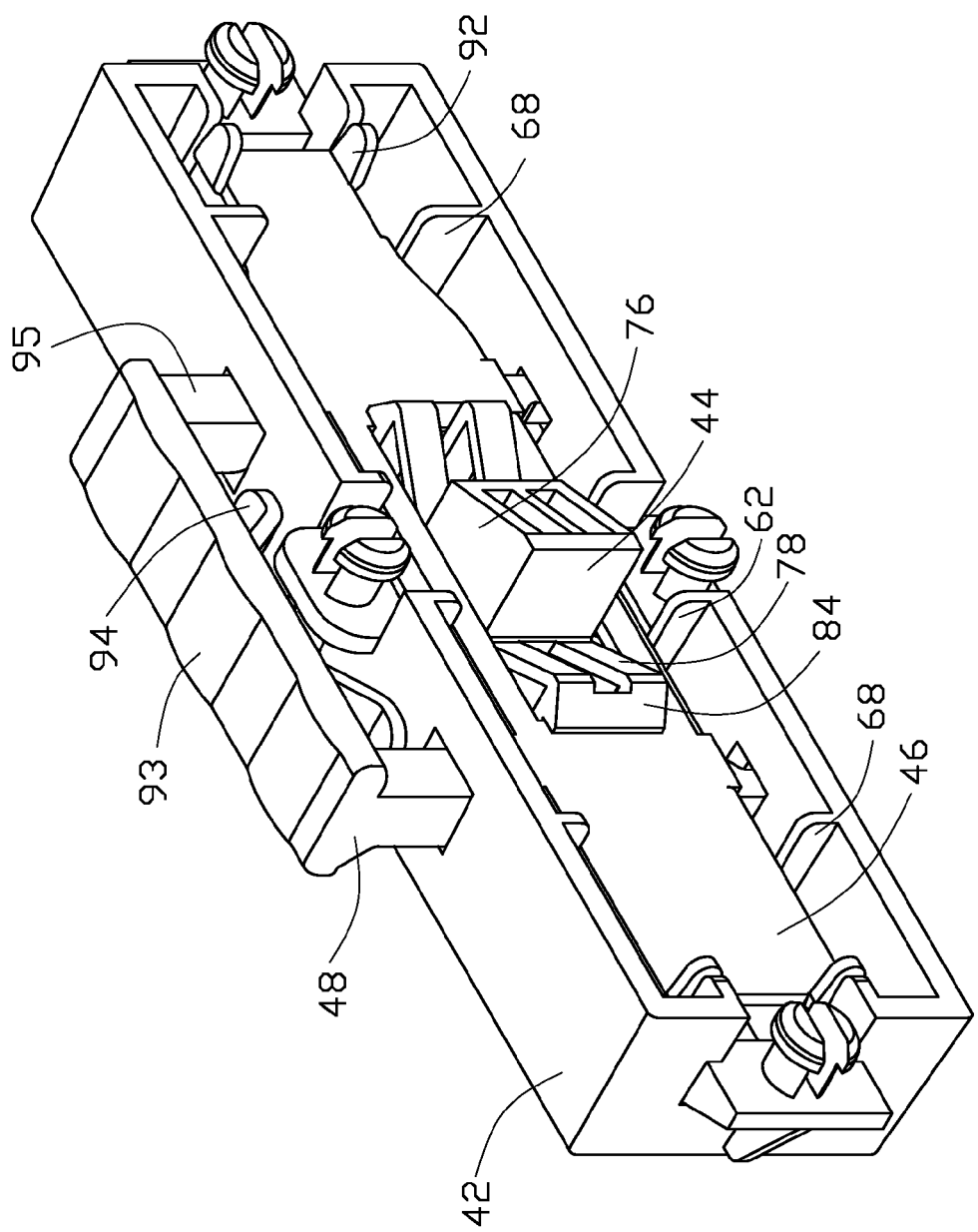
FIG. 4 is an enlarged, isometric assembled view of the locking module in FIG. 1, but shown from another aspect.

Referring to FIG. 3 and FIG. 4, the locking module 40 is constructed by assembling the housing member 42, the pushing member 44, the locking member 46, and the releasing member 48. The base plate 74 of the pushing member 44 is positioned at outer edges of the retaining portions 64. The pushing member 44 is pushed inward and the retaining portions 64 are resiliently deformed for receiving the base plate 74 in the receiving slots 66. At the same time, the two latching portions 86 of the pushing member 44 are inserted into the receiving portions 50. The hooks 52 are resiliently deformed for being received in the engaging slots 82. Thereby, the pushing member 44 is coupled to the housing member 42.

The locking member 46 is supported on the flat portions of the first arms 54 of the pushing member 44 with the wedge 76 of the pushing member 44 extending through the locking hole 88 of the locking member 466. Opposite edges adjacent to the locking hole 88 are contacted with the engaging sections 84 respectively. By pushing the locking member 46 close to the connecting wall 428 (see FIG. 6) of the housing member 42, the first arms 54 are resiliently deformed. The wings 78 are elastically deformed for the engaging sections 84 being engaged with the opposite edges adjacent to the locking hole 88. Thus, the locking member 46 is held in the housing member 42 by the pushing member 44 and the flat portions of the first arms 54 abut against the opposite end portions adjacent the respective latching tabs 92, of the locking member 46. The communication holes 91 are then aligned with the through holes 70 and the coupling holes 72 respectively. The locking member 46 is prevented from moving freely in the housing member 42 by the first ribs 62 and the second ribs 68.

Each extension leg 95 of the releasing member 48 extends through each corresponding through hole 70 and coupling hole 72. Each extension leg 95 is resiliently deformed for the clasp 99 being clasped at an edge adjacent to each corresponding coupling hole 72. The bent flat portions of the second resilient arms 94 are contacting an outer side portion of the wall 420. The dented portions 97 of the extension legs 95 are received in the communicating holes 91 of the locking member 46 respectively. As such, the releasing member 48 is inserted into the housing member 42.

Figure 5:
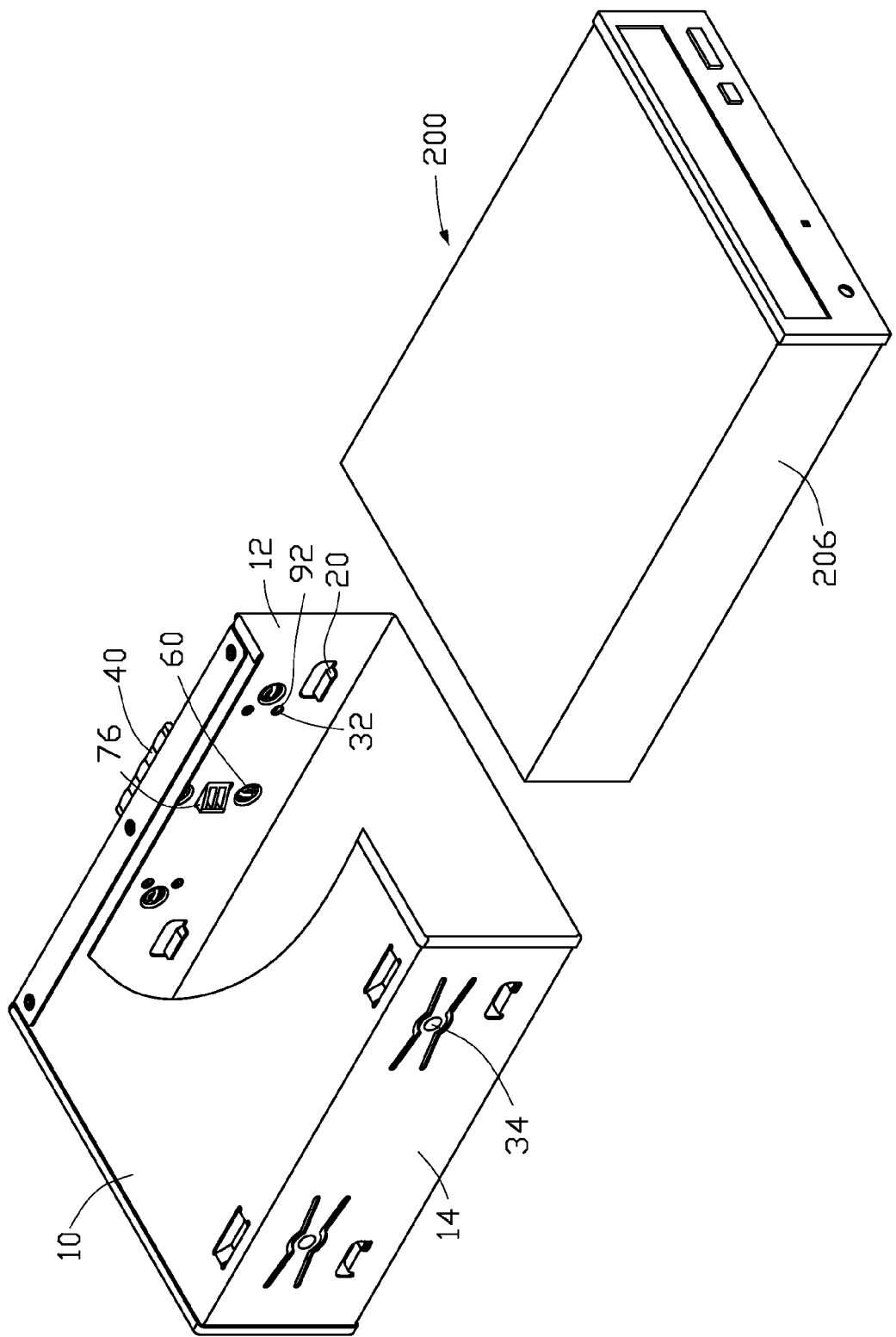
FIG. 5 is an assembled view of the locking module and the drive bracket in FIG. 1, the drive bracket being partially cutoff.

Referring to FIG. 5, in attaching the locking module 40 to the first side wall 12, the two elastic parts of each fixing member 60 are flexibly compressed for extending through the corresponding positioning hole 28 in the first side wall 12. The elastic parts are restored, and each fixing member 60 is locked in the protrusions 26. As such, the locking module 40 is fastened to the drive bracket 10. The wedge 76 of the pushing member 44 extends through the opening 30 defined in the first side wall 12. Each latching tab 92 faces each corresponding locating hole 32 of the drive bracket 10. Before the drive 200 is pushed into the drive bracket 10, the locking member 46 is held by the pushing member 44 in an unlocked position, where a first elastic force along a Y direction is exerted against the locking member 46 by the first resilient members 54 which is pressed by the locking member 46, and the wedge 76 of the pushing member 44 enters into the accommodating space 11 via the opening 30 while each latching tab 92 of the locking member is located at outside of the accommodating space 11.

Figure 6:
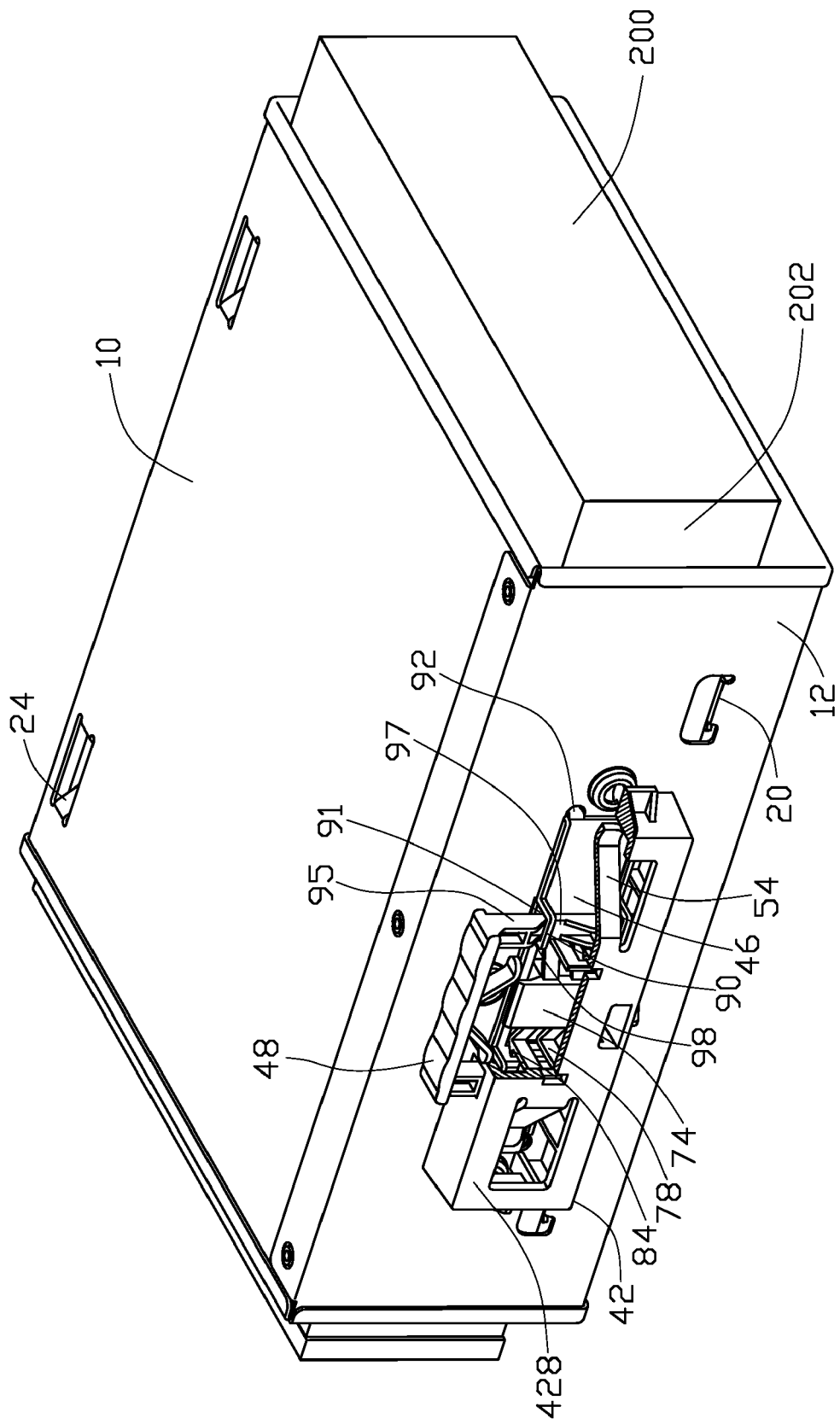
FIG. 6 is an isometric assembled view of FIG. 1 with the locking module in a locked state.

Referring to FIG. 6, the drive 200 is supported on the support members 20, and then pushed to slide into the drive bracket 10 by a force along an X direction. During the pushing process, a rear corner edge (not labeled) adjacent to the side plate 202 of the drive 200 contacts the inclined surface of the wedge 76. A first component force along the Y direction is produced when the rear corner edge slides along the inclined surface. The wedge 76 is urged to remove out of the accommodating space 11 through the opening 30 by the first component force.

When the wedge 76 is urged out of the drive bracket 10, the wing 78 of the pushing member 44 is resiliently deformed to cause the engaging sections 84 to move toward each other. The engaging sections 84 are therefore disengaged from the edges adjacent to the locking hole 88 respectively. Without being held by the pushing member 44, the locking member 46 is flipped toward the first side wall 12 by the first elastic force produced by the first resilient members 54. Each of the latching tabs 92 extends through each of the corresponding locating holes 32. With the drive 200 being further pushed to cause each fixing hole 204 aligning with the corresponding locating hole 32, each latching tab 92 is received in each corresponding fixing hole 204 defined in the side plate 202, such that the locking member 46 is in the locked position. Accordingly, the drive 200 is mounted to the drive bracket 10. In this situation, the dented portions 97 of the releasing member 48 are received in the communicating holes 91 of the coupling brackets 90 respectively.

Figure 7:
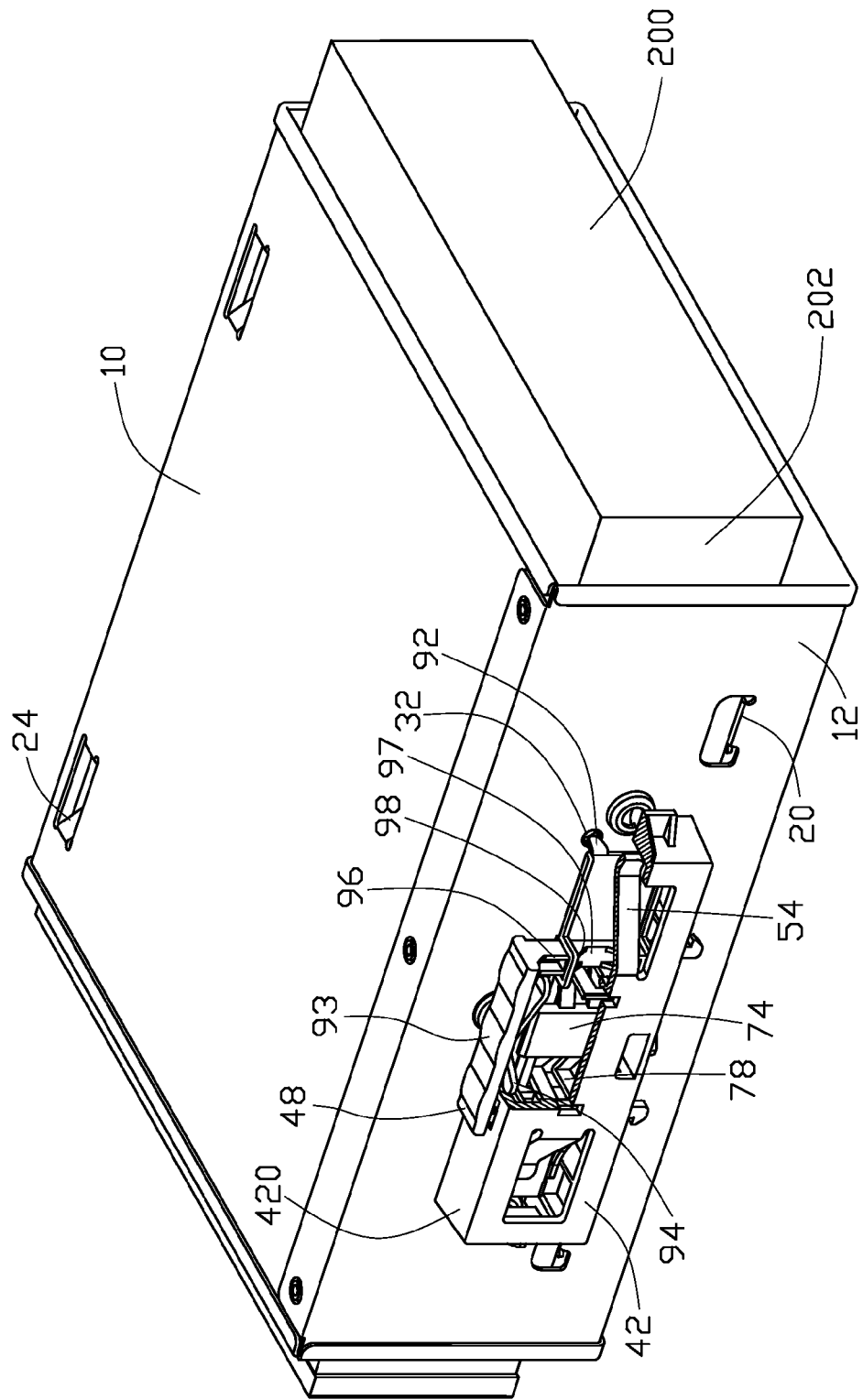
FIG. 7 is a view of FIG. 1 showing a disassembly process of the locking module with the locking module in a unlocked state.

Referring to FIG. 7, when dismounting the drive 200 from the drive bracket 10, the releasing member 48 is depressed firstly along a Z direction. The second resilient members 94 are resiliently deformed to produce a second elastic force against the wall 420. The slant portions 98 slide along the inner face of an outer beam of the respective coupling brackets 90. Such a relative movement produces a second component force on the coupling brackets 90 by the slant portions 98 along the Y direction. Each clasp 99 is moved away from the edges adjacent to the corresponding coupling hole 72. The locking member 46 is urged to move away from the locked position by the second component force. The latching tabs 92 retract from the fixing holes 204 of the drive 200. The releasing member 48 is held in a depressed state to resist the second elastic force for pulling the drive 200 out.

The drive 200 is pulled out along the X direction. When the drive 200 is pulled across the opening 30, the wings 78 of the pushing member 44 are restored. The wedge 76 extends through the opening 30 for being received in the accommodating space 11 again, and the engaging sections 84 are engaged with the opposite edges adjacent to the locking hole 88 respectively again. The locking member 46 returns to the unlocked position again, where the locking member 46 is held into the housing member 42 by the pushing member 44, and the first resilient members 54 exert the first elastic force against the locking member 46.

With the releasing member 48 being released, the releasing member 48 is moved along the Z direction by the second elastic force produced by the second resilient members 94. Each dented portion 97 of the releasing member 48 is received in the corresponding communicating hole 91 of the locking member 46 again. Each clasp 99 of the releasing member 48 is clasped at the edge adjacent to the corresponding coupling hole 72 again.

In this embodiment, the pushing member 44 is configured for holding or releasing the locking member 46 to or from the housing member 42. The pushing member 44 is urged to move along the Y direction (see FIG. 1) after the drive 200 is inserted into the drive bracket 10 by a force along the X direction (see FIG. 1). When the drive 200 is received in the accommodating space 11, the pushing member 44 is urged out of the drive bracket 10 to release the locking member 46, and the locking member 46 is moved, by the first arms 52 of the housing member 42, from the unlocked position to the locked position. The X direction is substantially perpendicular to the Y direction. As such, the pushing member 44 is considered a first translating mechanism for translating a movement of the drive 200 along a first direction, i.e., X direction into a movement of the locking member 46 along a second direction i.e., Y direction substantially perpendicular to the first direction. The releasing member 48 is configured for being moved along the Z direction (see FIG. 1) for urging the locking member 46 to move from the locked position to the unlocked position along the Y direction. The Z direction is substantially perpendicular to the X, Y direction. In this situation, the releasing member 48 is considered a second translating mechanism for translating a movement of the releasing member 48 along a third direction i.e., Z direction into a movement of the locking member 46 along the second direction substantially perpendicular to the third direction.

As the above-mentioned embodiments disclose, the drive 200 is mounted to the drive bracket 10 by the locking module 40 without using screws. Using the locking module 40 to mount the drive 200 saves time, because when the drive 200 is pushed into the drive bracket 10, the pushing member 44 is urged to move out of the accommodating space 11 to release the locking member 46 for allowing the locking member 46 to lock the drive 200 to the drive bracket 10. Moreover, the dismounting process is also convenient by use of the locking module 40 without having to use tools. The drive 200 can be detached from the drive bracket 10 simply by depressing the releasing member 48 of the locking module 40 for urging the locking member 46 to unlock the drive 200 from the drive bracket 10.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A mounting apparatus mounting a data storage device, the mounting apparatus comprising:
   a drive bracket defining an accommodating space configured for accommodating the data storage device therein;
   a housing member configured for being fastened to the drive bracket, the housing member being formed with at least a first resilient member;
   a locking member configured for locking the data storage device with the drive bracket;
   a pushing member coupled to the housing member configured for holding the locking member to the housing member, the pushing member being partially received in the accommodating space and holding the locking member being outside of the accommodating space and biasing against the first resilient member when the data storage device being detached from the drive bracket, the pushing member being urged to move out of the accommodating space and release the locking member such that the first resilient member being restored to drive the locking member to lock the data storage device with the drive bracket when the data storage device being received in the accommodating space; and
   a releasing member being attached to the housing member, the releasing member being depressed for urging the locking member to unlock the data storage device from the drive bracket.

2. The mounting apparatus as claimed in claim 1, wherein at least a fixing member with a substantially bulging end portion protrudes from one of side walls of the housing member, the drive bracket is defined with at least a positioning hole corresponding to the fixing member, the bulging end is resiliently deformed for the fixing member extending through the positioning hole, and the bulging end is restored for the housing member being fastened to the drive bracket.

3. The mounting apparatus as claimed in claim 1, wherein the data storage device defines at least a fixing hole in a side plate, the locking member comprises at least a latching tab, the latching tab is bent perpendicularly from the locking member, when the data storage device is received in the drive bracket, the first resilient member is restored, causing the latching tab to be inserted into the fixing hole for locking the data storage device with the drive bracket, and when the releasing member is depressed, the latching tab is urged to be retracted from the fixing hole for unlocking the data storage device from the drive bracket.

4. The mounting apparatus as claimed in claim 1, wherein the drive bracket comprises a first side wall, the first side wall defines an opening therein; the pushing member comprises a wedge-shaped section extending through the opening to be received in the accommodating space when the data storage device is removed out of the drive bracket, the wedge-shaped section comprises an inclined surface at an end portion, the pushing member is urged out of the drive bracket by sliding of the data storage device along the inclined surface.

5. The mounting apparatus as claimed in claim 4, wherein the pushing member comprises a base plate, the base plate is connected with the wedge-shaped section, the housing member comprises a plurality of side walls attached to the first side wall of the drive bracket, and receiving slots defined at the side walls, the base plate is received in the receiving slots in such a manner that the base plate is slidable relative to the housing member in a direction perpendicular to the first side wall of the drive bracket when the data storage device slides along the inclined surface of the wedge-shaped section.

6. The mounting apparatus as claimed in claim 5, wherein the pushing member comprises two wings extending slantways from two sides of the base plate, an engaging section protrudes from an end portion of each wing, the locking member is defined with a locking hole aligned with the opening of the drive bracket configured for providing an access for the wedge-shaped section entering into the accommodating space of the drive bracket, the wings are resiliently deformable for the engaging sections being engaged at edges adjacent to the locking hole to hold the locking member being outside of the accommodating space and biasing against the first resilient member.

7. The mounting apparatus as claimed in claim 3, wherein the releasing member comprises an operating portion and at least one extension leg extending from the operating portion, the at least one extension leg comprises a slant portion formed thereon, the locking member comprises at least a coupling bracket extending in an opposite direction that the latching tab extends, the locking member is urged to retract the latching tab from the fixing hole by depressing the operating portion to cause the slant portion sliding along the coupling bracket to thereby outward push the locking member in a direction away from the first side wall of the drive bracket.

8. The mounting apparatus as claimed in claim 7, wherein the releasing member further comprising at least a second resilient member extending downwards from the operating portion, the second resilient member is resiliently deformable for pressing against the housing member when depressing the operating portion, and is recovered when the operating portion is released.

9. The mounting apparatus as claimed in claim 8, wherein the housing member comprises a plurality of side walls attached to the first side wall of the drive bracket, at least one of the side walls is defined with at least a through hole for extending the extension leg therethrough, the extension leg is formed with a clasp at a distal end thereof, the extension leg is deformable for the clasp being clasped at an edge adjacent to the through hole after the second resilient member is recovered.

10. A mounting system comprising:
    a drive bracket comprising a first side wall, the first side wall defining at least a locating hole therein;
    a data storage device removably attached to the drive bracket by a pushing movement, the data storage device comprising a first side plate, the first side plate defining at least a fixing hole corresponding to the locating hole;
    a housing member mounted to the first side wall;
    a pushing member attached to the housing member, the pushing member comprising a first translating section protruding inwardly to an inner space of the drive bracket;
    a locking member comprising at least a latch, the locking member being resiliently compressed within the housing member by the first translating section, the locking member being released by the first translating section during the pushing movement of the data storage device into the drive bracket, and being urged by a resilient force exerted thereon to escape from the housing member and move toward the first side wall, thereby the latch extending through the locating hole to be received in the fixing hole.

11. The mounting system as claimed in claim 10, the housing member comprises a second translating section, the second translating section is configured for being depressed to retract the latch of the locking member from the inner space of the drive bracket.

12. The mounting system as claimed in claim 10, the first translating section comprises a wedge-shaped portion, the wedge-shaped portion is received in the inner space of the drive bracket when the data storage device being detached from the drive bracket, and the wedge-shaped portion is driven by the data storage device during the pushing movement to move out of the inner space for releasing the locking member.

13. The mounting system as claimed in claim 12, wherein the locking member defines a locking hole for allowing the wedge-shaped portion extending therethrough to enter into the drive bracket, the first translating section comprises a base plate slidably attached to the housing member in a direction perpendicular to the first side wall of the drive bracket, and a pair of wings extending slantways from opposite ends of the base plate, a pair of latching portions extending from the respective wings and fixed with the housing member, a pair of engaging sections respectively formed at conjunctions between the wings and the latching portions configured for engaging with edges of the locking hole, the wedge-shaped portion extending from the base plate such that when the wedge-shaped portion is driven by the data storage device to move out from the inner space of the drive bracket the wings are deformed to cause the engaging sections moving toward each other to thereby disengage from the edges of the locking hole.

14. The mounting system as claimed in claim 10, wherein a resilient member extends
from the housing member toward the first side wall of the drive bracket and abuts against the locking member adjacent the latch for providing the resilient force.

15. A mounting apparatus for a data storage device, comprising:
a bracket comprising a space configured for accommodating the data storage device therein and a side wall defining an opening;
a housing member fastened to the side wall of the bracket;
a locking member comprising a latch configured for locking the data storage device with the drive bracket;
a first resilient member configured for providing a resilient force to the locking member;
a deformable pushing member coupled to the housing member configured for holding the locking member to the housing member, the pushing member comprising a wedge-shaped portion extending through the opening to enter into the space of the bracket, and an engaging section engaging with one edge of the opening to keep the locking member at outside of the space, the wedge-shaped portion being driveable to slid out of the space via the opening and deform the pushing member to disengage the engaging section from the edge of the opening such that the first resilient member urges the locking member inward to allow the latch locking the data storage device with the drive bracket; and
a releasing member slidably attached to the housing member, the releasing member being depressable to move the latch of the locking member outward to thereby unlock the data storage device from the drive bracket.

16. The mounting apparatus as claimed in claim 15, wherein the housing member comprises a plurality of side walls between which the locking member is positioned, one of the side walls define a hole, the locking member comprises a coupling bracket extending therefrom in an opposite direction that the latch extends, the coupling bracket defines a hole aligned with the hole defined in the one of the side walls, the releasing member comprises an extension leg extending through said holes, a slanted face is formed at the extension leg configured for moving the coupling bracket outward to thereby move the latch outward when the releasing member is depressed.

17. The mounting apparatus as claimed in claim 15, wherein the pushing member comprises a base plate, the base plate is connected with the wedge-shaped portion, the housing member comprises a plurality of side walls attached to the first side wall of the drive bracket, and receiving slots defined at the side walls, the base plate is received in the receiving slots in such a manner that the base plate is slidable relative to the housing member in a direction perpendicular to the first side wall of the drive bracket when the data storage device slides along the inclined surface of the wedge-shaped portion.

* * * * *